3,124,603
PREPARATION OF THORIUM OXALATE
Wallis R. Bennett and Clifford W. Kline, Midland, Mich., assignors to The Dow Chemical Company, Midland, Mich., a corporation of Delaware
No Drawing. Filed July 2, 1962, Ser. No. 207,106
5 Claims. (Cl. 260—429.2)

The invention relates to an improvement in a method of preparing thorium oxalate and more particularly relates to an improved method of preparing a thorium oxalate whereby it exhibits a high packed bulk density.

In the preparation of thorium metal from thorium oxide the use of a dense thorium oxide increases the capacity of plant equipment and lowers the cost of the operation thereof. The preparation of dense thorium oxide is therefore desirable.

Experience has shown that thorium oxide prepared by the calcination of thorium oxalate exhibits about the same crystal form and shape as the oxalate before calcination. It is thus apparent that so-prepared thorium oxide is quite dependent on the crystalline character of the thorium oxalate from which it is prepared. In other words, a dense thorium oxide is prepared from a dense thorium oxalate.

Packed bulk density measurements are made by adding a weighed amount of dry sample to a graduated cylinder and gently tapping the base on a table or bench top until a constant volume reading is obtained. A dense thorium oxalate has a packed bulk density above 1.0.

The invention is predicated on the discovery that upon providing a constant ratio of a monovalent inorganic spectator cation to the dissolved thorium in the reaction mixture during the precipitation of thorium oxalate by the addition of an aqueous acidic thorium solution having a pH value below 4 to an oxalate solution at a temperature above 40° C., a readily filterable thorium oxalate is obtained and the packed bulk density of the thorium oxalate so obtained is markedly increased.

In carrying out the improved process of the invention an aqueous solution containing thorium is admixed with an aqueous oxalic acid solution, preferably by feeding the thorium solution into the oxalic acid solution. Although thorium oxalate precipitates from very dilute aqueous solution it is desirable that the thorium solution contain at least 0.05 percent by weight of thorium as $Th^{+4}$.

Usually the thorium is provided in the form of a sulfate, chloride or nitrate or other soluble salt.

The pH of the thorium solution should be less than 4 to avoid precipitation of thorium hydroxide. If the hydrogen ion concentration of the solution is greater than 10 normal the solution may be partly neutralized by an alkaline material, such as sodium hydroxide, to reduce the solubility of thorium oxalate in the acidic solution.

A suitable solution of oxalic acid contains about 10 weight percent of oxalic acid, though other concentrations may be employed if desired.

The spectator cation of the invention is added to the reaction mixture during the precipitation step, conveniently as a part of the thorium solution. Suitable concentrations of the spectator cation are from 0.5 to 15 moles of cation per mole of thorium provided in the aqueous thorium solution. A preferred proportion of spectator cation is about 4 to 6.5 moles per mole of thorium. It is desirable that the solution concentrations be such that not more than 2.5 moles of spectator cation need be employed per liter of aqueous thorium solution.

Spectator cations which may be used in the present process are $Na^+$, $K^+$, $NH_4^+$, and $Li^+$. The cation may be added in the desired amount as the simple sulfate, chloride or nitrate salt or other simple salt having an anion which does not form an insoluble ion pair with thorium ion. If added as an oxalate the cation containing solution and thorium containing solution must be simultaneously added to the reaction flask at a rate such that the cation to thorium ratio remains substantially constant within the above mentioned range. The most effective spectator cation on a molar basis is sodium ion, especially when added as the sulfate.

In some instances it may be desirable to add part of the amount of spectator cation, as a hydroxide or carbonate to partially neutralize a highly acidic solution, and add the balance desired as one of the simple salts aforementioned.

For example, in a process for recovering thorium from aqueous acidic leach liquor by solvent extraction, it is general practice to strip the thorium from the "loaded" organic extractant with sulfuric acid. The only slightly soluble thorium sulfate precipitates and is filtered off to form a crude sulfate cake which contains entrained sulfuric acid. Upon taking up the crude sulfate cake in water an acidic thorium solution is obtained. An appropriate addition of caustic partially neutralizes the acidic solution to a pH of about 1 to 2, and at the same time generates sodium sulfate in situ. Additional sodium is added as sodium sulfate before precipitating the thorium from the solution as the oxalate.

The role of the spectator cation is not completely understood but it is believed to interfere with the formation of fine crystallites or nuclei of thorium oxalate whereby crystals already started in the reaction mixture continue to grow and large square planar crystals predominate in the resulting thorium oxalate precipitate. It is essential that the ratio of the cation to the thorium be relatively constant within the above cited range. When employing the method of the prior art wherein aqueous thorium sulfate is added to a solution of oxalic acid and sodium oxalate the resulting precipitate of thorium oxalate is finely divided and difficult to filter and wash. It further exhibits a lower packed bulk density.

Maintenance of the reaction mixture at an elevated temperature is conducive to obtaining a high density crystalline thorium oxalate. Therefore, the precipitation is best carried out at a temperature in the range of 40 to 102° C., more preferably in the range of 70 to 90° C., the most preferred temperature being about 80° C.

During the admixing of the thorium and oxalic acid solutions in the presence of the spectator cation the so-obtained reaction mixture is agitated to get good mixing of the solutions. Agitation is generally continued for a holding period of about a half hour after completing the admixing. Then the precipitated $Th(C_2O_4)_2 \cdot 6H_2O$ is separated from the supernatant solution as by filtration and washed with water to remove any supernatant solution clinging to the precipitate. The washed precipitate is freed of liquid as by sucking it dry on a filter and then dried in a 110° C. drying oven to the dihydrate $(Th(C_2O_4)_2 \cdot 2H_2O)$. The dihydrate may be calcined to $ThO_2$ at a temperature of 600° C. in about 2 hours.

When thorium oxide is the desired product to be made immediately it is generally more efficient and less handling is required if the $Th(C_2O_4)_2 \cdot 6H_2O$ damp cake is calcined directly to thorium oxide.

In carrying out the method of the invention in the preparation of thorium oxalate from crude thorium sulfate cake, obtained as by stripping an organic solvent with sulfuric acid in a solvent extraction process, the crude moist cake containing free sulfuric acid is dissolved, in water to form an aqueous acidic thorium sulfate solution.

The addition of sodium sulfate in the amounts employed in the invention to the water used in the dissolution of the acidic cake has been found advantageous in that it hastens the dissolution thereof and increases the thorium concentration obtainable therefrom. The so-obtained aqueous thorium sulfate is then added directly to warm oxalic acid solution to precipitate thorium oxalate in the manner described hereinabove unless the solution is so acidic as to reduce the yield of thorium oxalate by increasing the solubility thereof. If the aqueous thorium sulfate solution obtained from acidic crude cake exhibits a hydrogen ion concentration greater than 10 normal, sodium hydroxide, or other suitable alkaline material is added to the acidic solution, conveniently as a concentrated aqueous solution, to bring the pH of the solution into the range of 0–4, before the precipitation of thorium oxalate.

Although the sodium hydroxide addition generates some sodium sulfate in situ it is usually insufficient for the purpose of the invention and the addition of more spectator cation is necessary to bring the cation-thorium molar ratio in the desired range.

EXAMPLE 1

As an example of the process of the invention, 1000 milliliters of an aqueous thorium sulfate solution containing 9.52 grams of thorium and 12.9 grams of sodium sulfate were added steadily over a one hour period to 108 milliliters of a 10 weight percent solution of $H_2C_2O_4 \cdot 2H_2O$. The oxalate solution had been heated to 80° C. and this temperature was maintained during the addition and the subsequent holding period. The oxalate solution was agitated during the addition and for the half hour holding period thereafter. The so-precipitated $Th(C_2O_4)_2 \cdot 6H_2O$ was readily filtered off and washed with 400 milliliters of water. The resulting filter cake was sucked dry by reduced pressure filtration, then transferred to a drying oven and dried at 110° C. to the dihydrate. The dried thorium oxalate dihydrate exhibited a packed bulk density of 1.37 grams per cubic centimeter. On calcining the thorium oxalate a thorium oxide was obtained which had a packed bulk density of 3.2 grams per cubic centimeter.

In additional experiments which illustrate the process of the invention thorium oxalate was prepared by adding aqueous thorium sulfate solutions containing 0.93 weight percent of thorium and various amounts, respectively, of sodium sulfate to respective portions of 10 weight percent oxalic acid solution in the same manner as described in Example 1. In each experiment the thorium oxalate formed was calcined to thorium oxide. The molar ratio $Na^+/Th^{+4}$ employed in each experiment and the packed bulk densities of the thorium oxalate and thorium oxide obtained are listed in Table I.

By way of comparison an aqueous thorium sulfate solution containing substantially no sodium was added to oxalic acid solution in a similar manner to that described in Example 1. Thorium oxide was prepared therefrom by calcining the oxalate salt. The bulk density of the thorium oxalate and of the thorium oxide obtained are listed in Table I after Blank.

*Table I*

| Test No. | Molar Ratio, $Na^+/Th^{+4}$ | $Th(C_2O_4)_2 \cdot 2H_2O$, grams/cc.[1] | $ThO_2$, grams/cc.[1] |
|---|---|---|---|
| 1 | 0.6 | 1.13 | 2.38 |
| 2 | 1.1 | 1.19 | 2.76 |
| 3 | 2.2 | 1.30 | 2.81 |
| 4 | 4.2 | 1.37 | 3.0 |
| 5 | 6.5 | 1.35 | 3.1 |
| 6 | 9.7 | 1.28 | 2.6 |
| Blank | 0 | 0.6 | 1.2 |

[1] Grams per cubic centimeter, packed bulk density.

In another series of experiments to illustrate the practice of the invention other spectator cations were employed as sulfates in the same manner as sodium ion in Example 1. The ions added, their respective molar ratios, and the bulk densities of the products are listed in Table II.

*Table II*

| Test No. | Ion Added as Sulfate | Molar Ratio, Ion/$Th^{+4}$ | $Th(C_2O_4)_2 \cdot 2H_2O$ grams/cc.[1] | $ThO_2$, grams/cc.[1] |
|---|---|---|---|---|
| 7 | $K^+$ | 4.2 | 1.30 | 2.7 |
| 8 | $NH_4^+$ | 4.3 | 1.30 | 2.9 |
| 9 | $Li^+$ | 4.3 | 1.0 | 2.0 |

[1] Packed bulk density.

In a further series of experiments which illustrate the practice of the invention other salts were used in the same manner as sodium sulfate was used in Example 1. The salts added, the proportion of spectator cation they supplied and the bulk densities of the products are listed in Table III.

*Table III*

| Test No. | Salt Added | Molar Ratio, Cation/$Th^{+4}$ | $Th(C_2O_4)_2 \cdot 2H_2O$, grams/cc.[1] | $ThO_2$, grams/cc.[1] |
|---|---|---|---|---|
| 10 | NaCl | 4.5 | 1.2 | 2.9 |
| 11 | $NaNO_3$ | 4.5 | 1.3 | 3.0 |
| 12 | $NH_4Cl$ | 4.5 | 1.3 | 3.0 |

[1] Packed bulk density.

In yet an additional group of experiments which illustrate the practice of the invention sodium sulfate was employed as in Example 1, but the temperature of the oxalic acid solution during the precipitation step was varied. The effect of temperature at this point of the process if reflected in the bulk densities listed in Table IV.

*Table IV*

| Test No. | Molar Ratio, $Na^+/Th^{+4}$ | Temperature During Precipitation, °C. | $ThO_2$ grams/cc.[1] |
|---|---|---|---|
| 13 | 4.3 | 102 | 2.25 |
| 14 | 4.3 | 80 | 3.3 |
| 15 | 4.3 | 50 | 2.6 |

[1] Packed bulk density.

Among the advantages of the improved method of the invention is the greater ease of filtering thorium oxalate obtained thereby.

This application is a continuation-in-part of our copending application Serial No. 49,417, filed August 15, 1960, now abandoned.

We claim:

1. In a process for preparing a relatively high bulk density thorium oxalate wherein an aqueous solution containing thorium and having an acidity in the range of pH 4 to a hydrogen ion concentration of 10 normal is fed into an oxalic acid solution to form a reaction mixture which is maintained at a temperature in excess of about 40° C., the improvement which comprises: providing in the reaction mixture, from which thorium oxalate is precipitated, and throughout the precipitation step, as a constant ratio, from about 0.5 to 15 moles of a monovalent, inorganic, spectator, cation per mole of thorium in said reaction mixture, said cation being selected from the group consisting of sodium, potassium, ammonium, lithium, and mixtures thereof.

2. In a process for preparing a relatively high bulk density thorium oxalate from an aqueous solution containing thorium and having an acidity in the range of pH 4, to a hydrogen ion concentration of 10 normal, the improved sequence of steps which comprises: adding to the said aqueous solution from about 0.5 to 15 moles of a monovalent, inorganic, spectator cation per mole of thorium in the aqueous solution, the number of moles of said cation not exceeding 2.5 moles per liter of aqueous solution, said cation being selected from the group consisting of sodium, potassium, ammonium and lithium ions; feeding said aqueous solution containing said thorium and said cation into an oxalic acid solution while the oxalic acid solution is maintained at a temperature in the range of 40 to 102° C., thereby maintaining a constant ratio of moles of spectator cation per mole of thorium in the reaction mixture during the precipitation of thorium oxalate, and separating a precipitated, relatively high bulk density thorium oxalate from the oxalic acid solution.

3. In a process for preparing a relatively high bulk density thorium oxalate from a highly acidic aqueous solution containing thorium, the improved sequence of steps which comprises: adding alkaline material to the aqueous solution to reduce the hydrogen ion concentration therein to less than 10 normal and below a pH value of about 4; also adding to the said aqueous solution from about 0.5 to 15 moles of a monovalent, inorganic, spectator cation per mole of thorium in the aqueous solution, the number of moles of said cation not exceeding 2.5 moles per liter of aqueous solution, said cation being selected from the group consisting of sodium, potassium, ammonium and lithium ions and mixtures thereof; feeding said aqueous solution containing said thorium and said spectator cation into an oxalic acid solution while the oxalic acid solution is maintained at a temperature in the range of 40 to 102° C., said oxalic acid solution providing about 105 percent of the stoichiometric amount of oxalic acid theoretically required for the precipitation of all of said thorium, from a reaction mixture in which the ratio of moles of spectator cation to moles of thorium does not deviate from the said range of 0.5 to 15, thereby precipitating thorium oxalate; and separating a precipitated relatively high bulk density thorium oxalate from the oxalic acid solution.

4. In a process for preparing a relatively high bulk density thorium oxalate from an aqueous solution containing thorium and having an acidity in the range of pH 4, to a hydrogen ion concentration of 10 normal, the improved sequence of steps which comprises: adding to the said aqueous solution from about 0.5 to 15 moles of a salt selected from the group consisting of the simple chlorides, sulfates and nitrates of sodium, potassium, lithium and ammonium, and mixtures thereof, the number of moles of said salt not exceeding 2.5 moles per liter of said aqueous solution; bringing said aqueous solution into contact with an aqueous oxalic acid solution at a temperature between 40 and 102° C., thereby to form a reaction mixture in which the ratio of moles of spectator cation to moles of thorium does not deviate from the said range of 0.5 to 15 during the precipitation of a relatively high bulk density thorium oxalate; maintaining said reaction mixture at a temperature in the range of 40 to 102° C. during a holding period; and separating thorium oxalate from the reaction mixture.

5. In a process for preparing a relatively high bulk density thorium oxalate from an aqueous solution containing thorium sulfate and having an acidity in the range of pH 4 to a hydrogen ion concentration of 10 normal, the improved sequence of steps which comprises: providing in the said aqueous solution from about 0.5 to 15 moles of sodium sulfate per mole of thorium sulfate in the aqueous solution; feeding said aqueous solution containing thorium and sodium sulfates into an oxalic acid solution while the oxalic acid solution is at a temperature in the range of 40 to 102° C., thereby to form a reaction mixture in which the ratio of moles of spectator cation to moles of thorium does not deviate from the said range of 0.5 to 15, said oxalic acid solution containing about 10 weight percent of oxalic acid and providing about 105 percent of the stoichiometric amount thereof for the precipitation of said thorium as the oxalate; maintaining the so-formed reaction mixture at said temperature during a holding period; and separating the so precipitated relatively high bulk density thorium oxalate from the reaction mixture.

No references cited.